(12) United States Patent
Kingston

(10) Patent No.: US 8,310,079 B2
(45) Date of Patent: Nov. 13, 2012

(54) TIDAL ENERGY SYSTEM

(76) Inventor: William Kingston, Dublin (IE)

( * ) Notice: Subject to any disclaimer, the term of this patent is extended or adjusted under 35 U.S.C. 154(b) by 10 days.

(21) Appl. No.: 13/158,617

(22) Filed: Jun. 13, 2011

(65) Prior Publication Data

US 2012/0000193 A1 Jan. 5, 2012

Related U.S. Application Data

(63) Continuation-in-part of application No. 12/087,756, filed on Jul. 14, 2008, now abandoned.

(30) Foreign Application Priority Data

Oct. 4, 2010 (GB) .................................. 1016714.6

(51) Int. Cl.
  *F03B 13/00* (2006.01)
  *H02P 9/04* (2006.01)
(52) U.S. Cl. .......................................... 290/54; 290/43
(58) Field of Classification Search .................. 290/42, 290/43, 54; 60/497, 498, 495, 496, 501, 60/502, 504, 505, 698; 405/76, 75; 417/330, 417/331, 333; 416/31
See application file for complete search history.

(56) References Cited

U.S. PATENT DOCUMENTS

| | | | | |
|---|---|---|---|---|
| 4,208,877 A * | 6/1980 | Evans et al. | ...................... | 60/495 |
| 5,431,589 A * | 7/1995 | Corona | ............................. | 441/4 |
| 2004/0070210 A1* | 4/2004 | Johansen et al. | ................ | 290/43 |
| 2008/0226398 A1* | 9/2008 | Gibberd et al. | ............... | 405/223 |
| 2009/0081055 A1* | 3/2009 | Windle | ......................... | 417/333 |

FOREIGN PATENT DOCUMENTS

WO    WO 2004083629 A1 *    9/2004

* cited by examiner

*Primary Examiner* — Julio Gonzalez

(57) ABSTRACT

A tidal energy capture means connects a turbine to its anchor by telescopic members which pivot about the anchor as axis in the plane of the tidal flow and whose combined length depends upon the force of this flow. These members can be locked at prescribed lengths by a remote signal, to control the level of the turbine during this movement. The anchor consists of a plug and socket, with buoyancy means for positioning the plug in the socket, and the telescopic members can be a rotatable shaft which drives equipment in the plug.

4 Claims, 9 Drawing Sheets

TIDAL ENERGY SYSTEM

This is a continuation-in-part application, which claims priority from my application Ser. No. 12/087,756, filed Jul. 14, 2008 which will be expressly abandoned on the filing date of this application. Application Ser. No. 12/087,756 in turn is a 371 application from my PCT application No. WO2007IE00004.

The new disclosure is in FIGS. 7-9 and the explanation thereof, and claims priority from application No. 1016714.6, filed in Great Britain on Oct. 4, 2010.

TECHNICAL FIELD

The technical field of this invention is that of capturing energy from the tides, especially by the 'free-stream' method which does not use a barrage.

BACKGROUND ART

Since the energy in a stream of water varies as the cube of its speed, it is desirable to locate 'free-stream' tidal energy devices where the stream is fastest. For example, headlands form obstacles to a tidal stream which cause the stream to accelerate as it passes around them. Also, because of boundary layer effects, more energy is available at a distance above the sea bed. However, already-known 'free-stream' arrangements for taking advantage of the fact that water streams tend to be faster close to the surface, require either expensive seabed foundations for rugged permanent structures, which may also impede navigation, and or the use of divers for retrieval of gear when this is required for maintenance purposes.

DISCLOSURE OF INVENTION

This invention overcomes these drawbacks. In addition, the danger of damage to tidal energy equipment from storms is greater the closer to the surface the equipment in positioned. But because the energy in a water wave is effectively attenuated to zero at half the wavelength, a free-stream tidal energy system can be improved by arranging for its reaction means to be positioned at different levels, according to the diurnal and lunar month variations in the rate of tidal flow and the presence of turbulence due to storms. This invention enables automatic optimum positioning of the reaction means for capturing the tidal energy, when the tide is running and when it is reversing direction, as well as when danger from storms is predicted.

BRIEF DESCRIPTION OF DRAWINGS

In the accompanying drawings of examples of ways of carrying the invention into practice.

Of these, FIG. 7 is a section drawing which shows the general arrangement of this version of the system, with the turbine carried downstream by the tide, pulling a piston to the top of its cylinder.

FIG. 8 is a similar section drawing, showing how when the tidal force ceases, the system's buoyancy moves the turbine up towards the top of its arc, but at the same time vacuum in the cylinder will move the piston to the lower end of its cylinder, to reduce the distance between anchor and turbine, and so prevent the turbine from breaking the surface; and FIG. 9 is a section drawing which shows how a spring can interact with the force of the tidal flow to control the combined length of the pair of tubes as an alternative to using movement of a piston in a cylinder for this purpose.

BEST MODE FOR CARRYING OUT THE INVENTION

Figure 1:
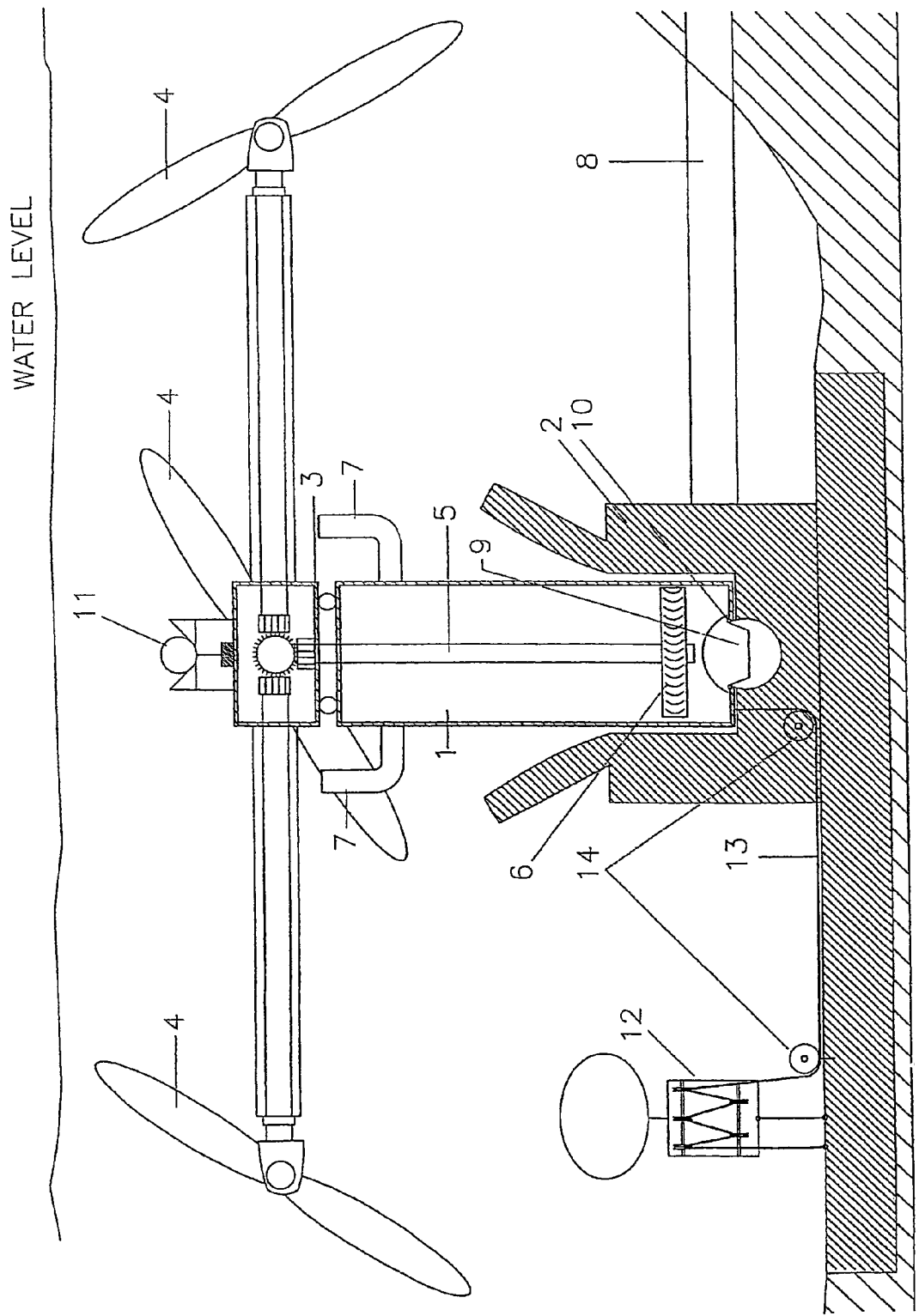
FIG. 1 is a section of a first variant of the invention, in which the energy in the water current is captured for pumping water which can be used, for example, to augment the energy output of offshore wind turbines or to be stored onshore so that its potential energy is available for use around and at the tidal null points, when no or little energy is obtainable from the water stream.

In FIG. 1, a substantially cylindrical housing for a water pump (1) is adapted to nest closely in the lower part of an anchor chamber which has a funnel-shaped open top (2) fixed to the sea bed. Gearbox (3) is rotatably fixed to the top of housing (1) and transmits power extracted from the tidal flow by reaction means on drive shafts (4, 4, 4) connected in gearbox (3) by a gear train and common drive shaft (5) to impeller (6). Gearbox (3) is rotatable so as to allow reaction means (4,4,4) to align themselves in accordance with reversal of the tidal stream's direction. To avoid carrying debris which is frequently in the water stream close to the sea bed, into the mechanism, water for pumping enters at the top of tubes (7, 7), whence it is forced by impeller (6) into pipeline (8) through port (9) in the centre of the underside of housing (1) and a corresponding opening in the top of pipeline (8). Sealing between these two components is then achieved through the pressure of the weight of housing (1) and its associated equipment on a seal of 'O'-ring type (10) fitted to the opening in the top of pipeline (8). Marker float and line reel assembly with remotely actuated release (11) is attached to the top of gearbox (3). (The components of release (11) are illustrated in FIG. 6). (12) is a float and pulley array attached to cable (13) which passes around pulleys (14, 14) fixed to anchor chamber (2) before being divided into three for connection to the underside of housing (1) at three equidistant points on its perimeter.

In operation of this variant of the invention, energy is extracted from the tidal flow by reaction means (4,4,4) and transmitted through gear train and shaft (5) to impeller (6) which pumps water through pipeline (8) to its destination, which might be a pumped storage scheme, or another impeller, for example in a wind turbine installation.

Figures 6A, 6B, 6C, 6D:
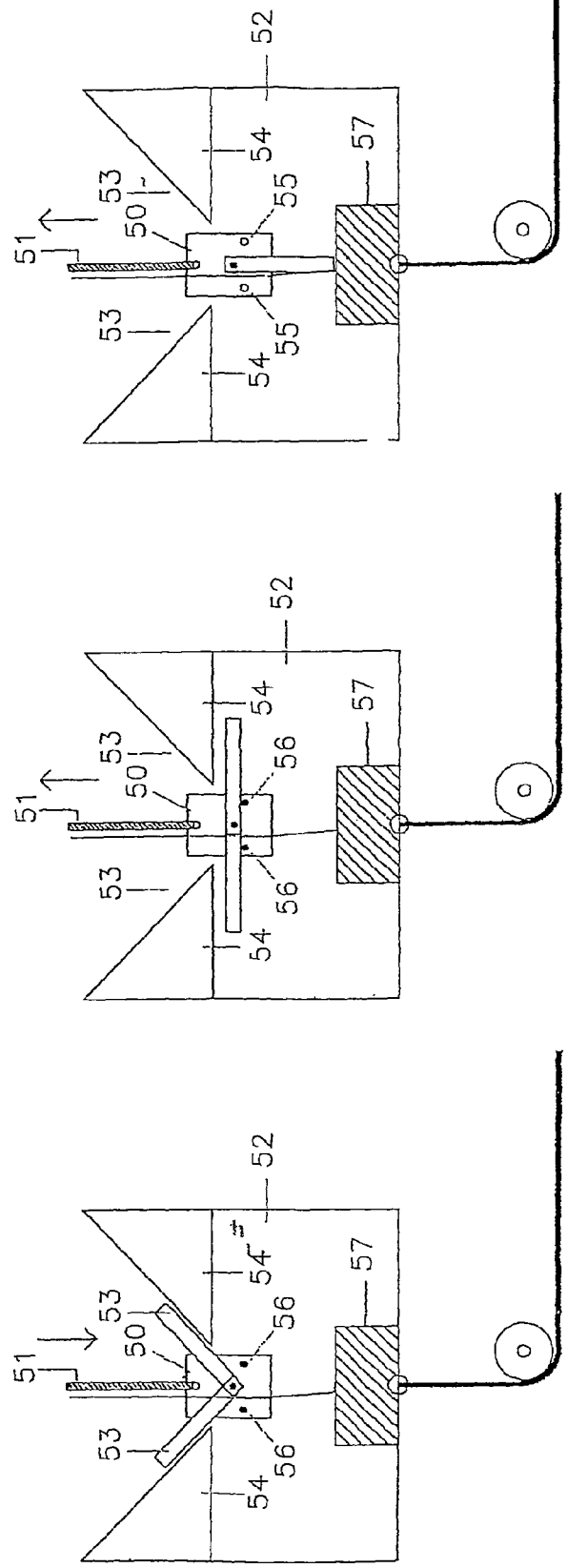
FIGS. 6A to 6D show details of some components of the invention, including those which are used for retrieving gear on the sea bed for maintenance and for repositioning it afterwards.

When the system requires maintenance, a barge (not shown) is dynamically positioned over anchor chamber (2) and at a tidal null point the float of assembly (11) is released by an acoustic signal or similar means to carry a line from its storage reel (57) in assembly (11), to the surface. (Components numbered (50) to (57) are illustrated in FIG. 6, and can be best understood by reference to this Figure). When the float is retrieved, messenger (50) to which is attached retrieving cable (51) is slidably attached to the line of assembly (11) and allowed to drop clown into receiver (52) of assembly (11) on the top of gearbox (3). Messenger (50) has two threaded holes (55, 55) into which pins (56, 56) can be inserted before messenger (50) is dropped down to receiver (52). Holes (55, 55) are positioned so that their pins (56, 56) support arms (53, 53) of messenger (50) when these arms are in the horizontal position. The arms (53, 53) of messenger (50) are free to pivot upwardly so that they can enter the jaws (54, 54) which define the mouth of receiver (52) (FIG. 6A). However, when they have passed through jaws (54, 54) they are prevented from pivoting further than the horizontal position by pins (56, 56) (FIG. 6b). Since they cannot pass back through jaws (54, 54) when they are in this position, upwards pull from the barge on retrieving cable (51) is safely able to lift water pump housing (1) gearbox (3) and reaction means (4,4,4) out of anchor chamber (2) and bring them to the surface. This process exerts a downward pull on the float of float and pulley array (12) through cable (13) but because of the pulley array, this movement is only a prescribed small proportion of the movement to the surface of housing (1) gearbox (3) and reaction means (4,4,4). The depth of operation of float and pulley array (12) can therefore always be kept within whatever limits are imposed by navigation or other considerations, compared with using flotation means without the pulley array.

When it is desired to re-position the system after maintenance work, marker float and line reel assembly (11) with line re-reeled and remotely actuatable release re-set, are replaced in their original positions in relation to receiver (52). The pins (56, 56) which inhibit the pivoting of arms (52, 52) are replaced with corrodable pins as means of keeping messenger (50) connected to receiver (52) for a prescribed time. Housing (1) with attached gearbox (3) and reaction means (4,4,4) can now be lowered back into position in anchor chamber (2) under control from above by retrieving cable (51) and from below by cable (13) which will be under tension from the buoyancy of float and pulley array (12). Sealing of the joint between port (9) in pump housing (1) and pipeline (8) is then brought about by the weight of pump housing (1) on the opening in pipeline (8) with 'O' ring seal in between them.

The process of repositioning housing (1) in anchor chamber (2) allows the float of float and pulley array (12) to move upwards, but because of the pulley array, this movement will be small in relation to the downwards movement of housing (1) gearbox (3) and reaction means (4,4,4). Such repositioning is facilitated by the guiding of the lower end of pump housing (1) into its close fit within anchor chamber (2) by the funnel-shaped opening at the top of anchor chamber (2) and the fact that the pull from the float and pulley array (12) through its attachment to three equidistant points on the underside of housing (1) guides housing (1) along a precise vertical trajectory, down to its mating with and sealing to the opening in pipeline (8).

The corrodable pins which can be inserted into holes (55, 55) to limit the pivoting movement of arms (53, 53) and so lock messenger (50) to receiver (52) for a prescribed time until they no longer have the strength to do so, can be suitably made from extrusions of a mixture of metal powders which form a galvanic couple. Typical such couples are magnesium or aluminium with nickel or iron. Experiments have shown that the galvanic couples formed by optimal combinations of this kind can produce links which will corrode substantially to failure under a load within 3% of a prescribed time after immersion in sea water, and that this time can be as short as desired by manipulating the relative proportions of the powders. Links can therefore be made for this application which will maintain their strength to keep messenger (50) and retriever (52) locked together until after the repositioning of housing (1) in anchor chamber (2) has been accomplished Shortly after that, however, they will no longer be strong enough to be able to prevent arms (53, 53) from pivoting freely downwards, as shown in FIG. 6C. This figure also shows holes (55, 55) not pins (56, 56) to indicate that the second set of pins have corroded completely or almost so. Well before this, they will have lost enough strength to allow arms (53, 53) to pivot downwards, when messenger (50) becomes free to be pulled upwards through the jaws (54, 54) of the mouth of receiver (52) to the barge on the water surface. A time window of still water for carrying out this retrieval and re-positioning process is of course provided twice each day at the tidal null points.

Figure 2:
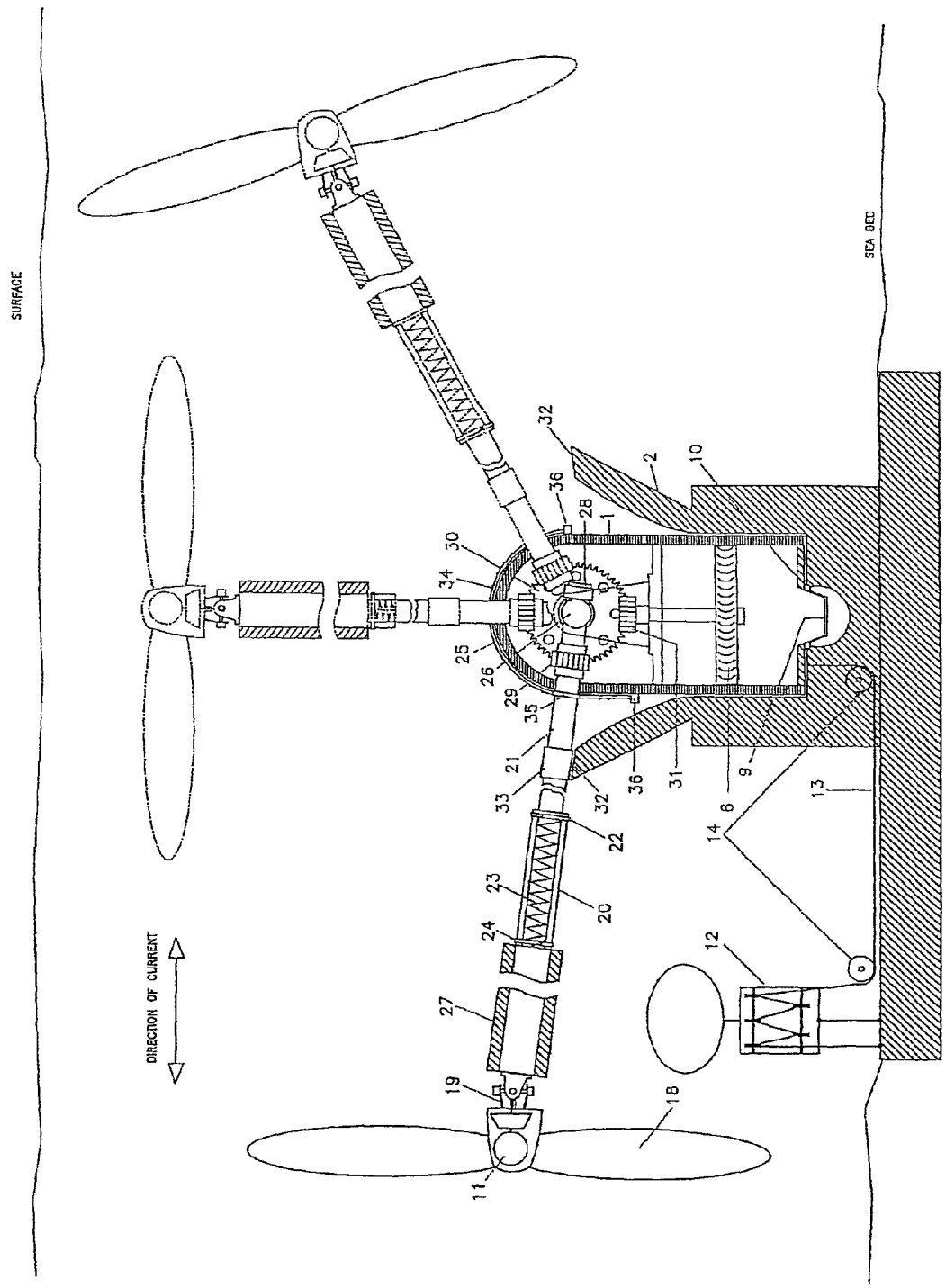
FIG. 2 is a section of a second variant of the invention, which is adapted to capture the energy in the upper part of a tidal current, but without any part of the equipment coming closer to the surface than a prescribed depth, even around and at tidal null points.

In FIG. 2, as in FIG. 1, a substantially cylindrical housing for a water pump (1) is adapted to nest closely in the lower part of an anchor chamber with a funnel-shaped open top (2) fixed to the sea bed. Reaction means (18) is attached by flexible coupling (19) to a telescopic drive shaft comprised of an outer tube (20) into which an inner tube (21) slidably fits. Pin (22) through tube (21) is extended to fit through longitudinal slots in tube (20) so that although both tubes can move longitudinally in relation to each other for the length of the slots in tube (20), they rotate as a single shaft. (23) is a tension spring attached at one end to pin (22) and at the other to pin (24) which passes through tube (20). Tube (21) passes through a slot (25) in housing (1) and is journalled in an axle (26) mounted in this housing, so that the combination of shafts (20, 21) is capable of substantially arcuate movement in the vertical plane or planes of the tidal stream. (27) is a collar on tube (20) which contains enough buoyant material to render the combination of reaction means, coupling and telescopic drive shaft of slightly positive buoyancy. Tube (21) also carries a thrust bearing (28) and a pinion (29), which meshes with a crown gear (30), rotating freely on axle (26). A second pinion (31) whose shaft is connected to impeller (6) of a water pump in its housing (1) also meshes with crown gear (30). Supports (32, 32) are the surfaces at the end of slot (25) in the funnel-shaped open top of anchor chamber (2). Bearing (33) is attached to tube (21) at a point where this tube is capable of meeting supports (32, 32). Flexible cover (34) over slot (25) in housing (1) is mounted on tube (21) by bearing (35) so as to move with the arcuate movement of tube (21). Weights (36, 36) are attached to each end of flexible cover (34). Float and line reel assembly with remotely actuated release (11) is located in the hub of reaction means (18) which are attached to tube (20) through flexible coupling (19). The arrangements for removal of the equipment to the surface for maintenance and for repositioning it afterwards, for guiding it back into the chamber of anchor chamber (2) and for mating and sealing its connection with pipeline (8) are the same as for the first variant of the invention, already described.

In operation of this second variant of the invention, at the null point of tidal flow, the combination of reaction means, coupling and telescopic drive shaft is in a vertical position, because of the effect of buoyancy collar (27) on tube (20) The combined length of tubes (20) and (21) is also shortened under the force of tension spring (23) When flow begins, reaction means (18) are earned downstream by it, causing telescopic shaft (20, 21) to move arcuately in the same direction, and also to extend against the force of spring (23). Because of the combination of pinion (29) and crown gear (30) telescopic shaft (20, 21) can do this whilst still rotating under the force generated by reaction means (18). These means deliver power to impeller (6) via pinion (29) crown gear (30) and pinion (31). To avoid carrying debris which is frequently in the water stream close to the sea bed, into the mechanism, most of the water for pumping enters at the top of tube (20) and passes through tubes (20, 21) into housing (1), whence it is pumped into pipeline (8) through port (9) in the lower surface of housing (1). As the rate of flow increases, the angle taken up by telescopic shaft (20, 21) is pressed closer to the horizontal, but reaction means (18) are protected from coming into contact with the sea bed because bearing (33) on tube (21) comes into contact with the top of either of the supports (32, 32) which put a lower limit to the arcuate movement of telescopic shaft (20, 21). As the tidal flow ceases, telescopic shaft (20, 21) moves back again towards the vertical, contracting in length as it does so under the force of spring (23). It will remain in the vertical position until the tidal flow begins again, when reaction means (18) are carried with it in the opposite direction to repeat the power generation cycle. Because of this arrangement, reaction means (18) can operate at whatever depth from the surface is desired when the tide is flowing, without actually coming up to the surface at or around the tidal null point. Tube (21) which is part of telescopic drive shaft (20, 21) is supported through bearing (35) by the sides of slot (25) in housing (1) against lateral forces, and flexible covering (34) is moved by its attachment to tube (21), also through bearing (35) to cover this slot on the upstream side of housing (1) so as to prevent abrasive material carried in the tidal stream from gaining access to the mechanism. Weights (36, 36) attached to each end of flexible covering (34) act to prevent bunching of the covering during this movement. When the system requires maintenance, it is retrieved and repositioned in the same way as in the first variant of the invention.

In order to make it possible for this variant of the invention to be used effectively in locations where the directions of flood and ebb tides are not in the same vertical plane because of the configuration of the adjacent sea bed or land, housing (1) has to be provided with a small degree of freedom to rotate about a substantially vertical axis within anchor chamber (2). The forces of tidal flow will bring about this limited rotation by aligning telescopic drive shaft (20, 21) with the direction of flow, and will not be inhibited by force from cables (13).

Figure 3:
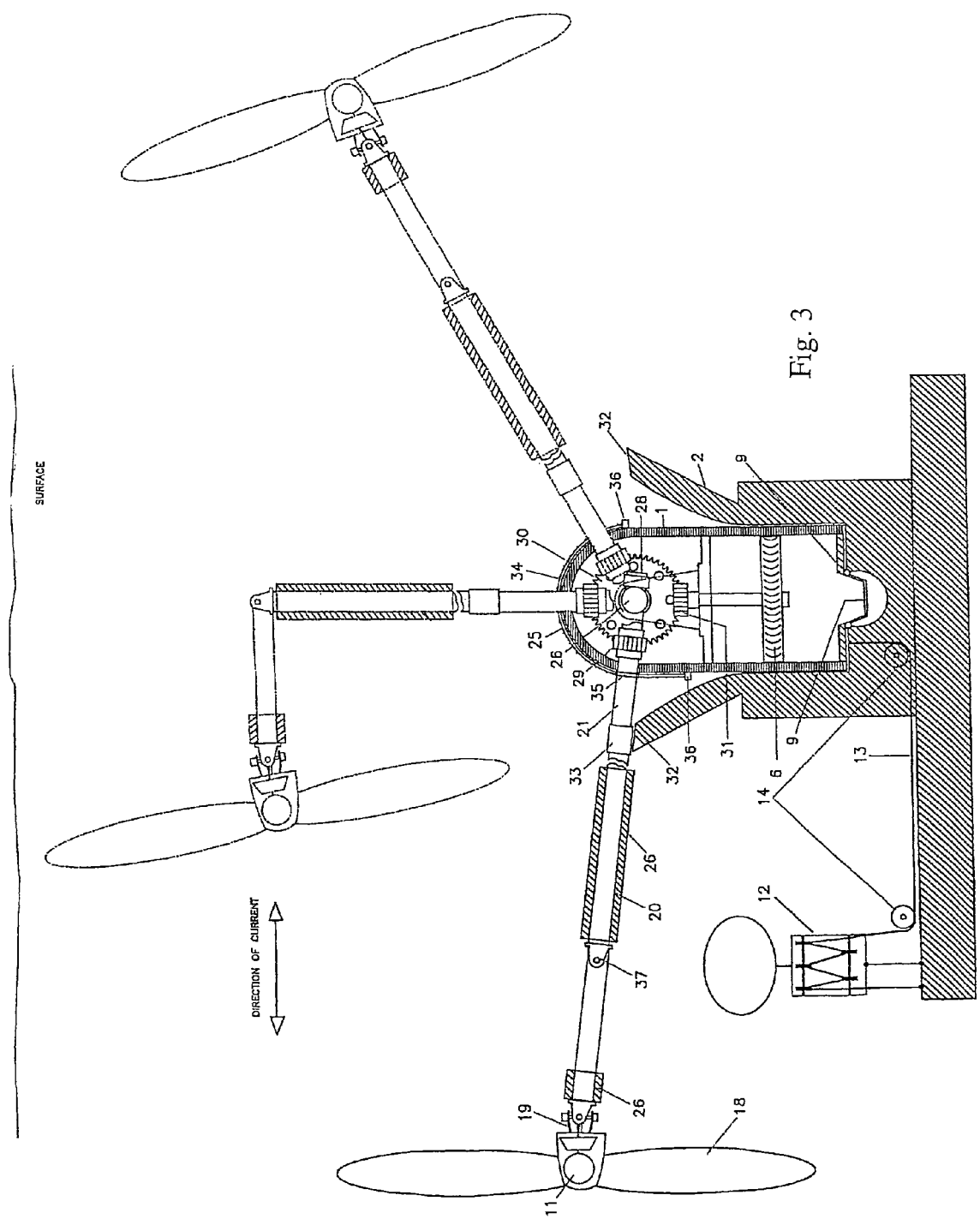
FIG. 3 is a section of a third variant of the invention, which shows a second means of preventing the energy-capture means from coming closer to the surface than a prescribed depth, even around and at tidal null points.

In FIG. 3, tubes (20, 21) do not slide relatively to each other, but instead the lower end of tube (20) is connected to the upper end of tube (21) by flexible doupling (37). Buoyant material (26, 26) is divided between the two tubes so that whereas tube (21) has positive buoyancy, the combination of tube (20), flexible coupling (19), and reaction means (18), has slightly negative buoyancy.

In operation of this third variant of the invention, at the approach of the tidal null point, the buoyancy in tube (21) causes it to move towards a vertical position. However, since the combination of tube (20), flexible coupling (19), and reaction means (18) is not positively buoyant, it will pivot downwards about flexible coupling (37). When the tidal stream starts to flow again, however, its force on reaction means (18) brings both tubes into line with each other once more. In this variant of the invention, water to be pumped enters through the top of tube (20). Removal of the gear for maintenance and its re-positioning, are carried out in the same way for this version of the invention as for other versions described earlier.

Figure 4:
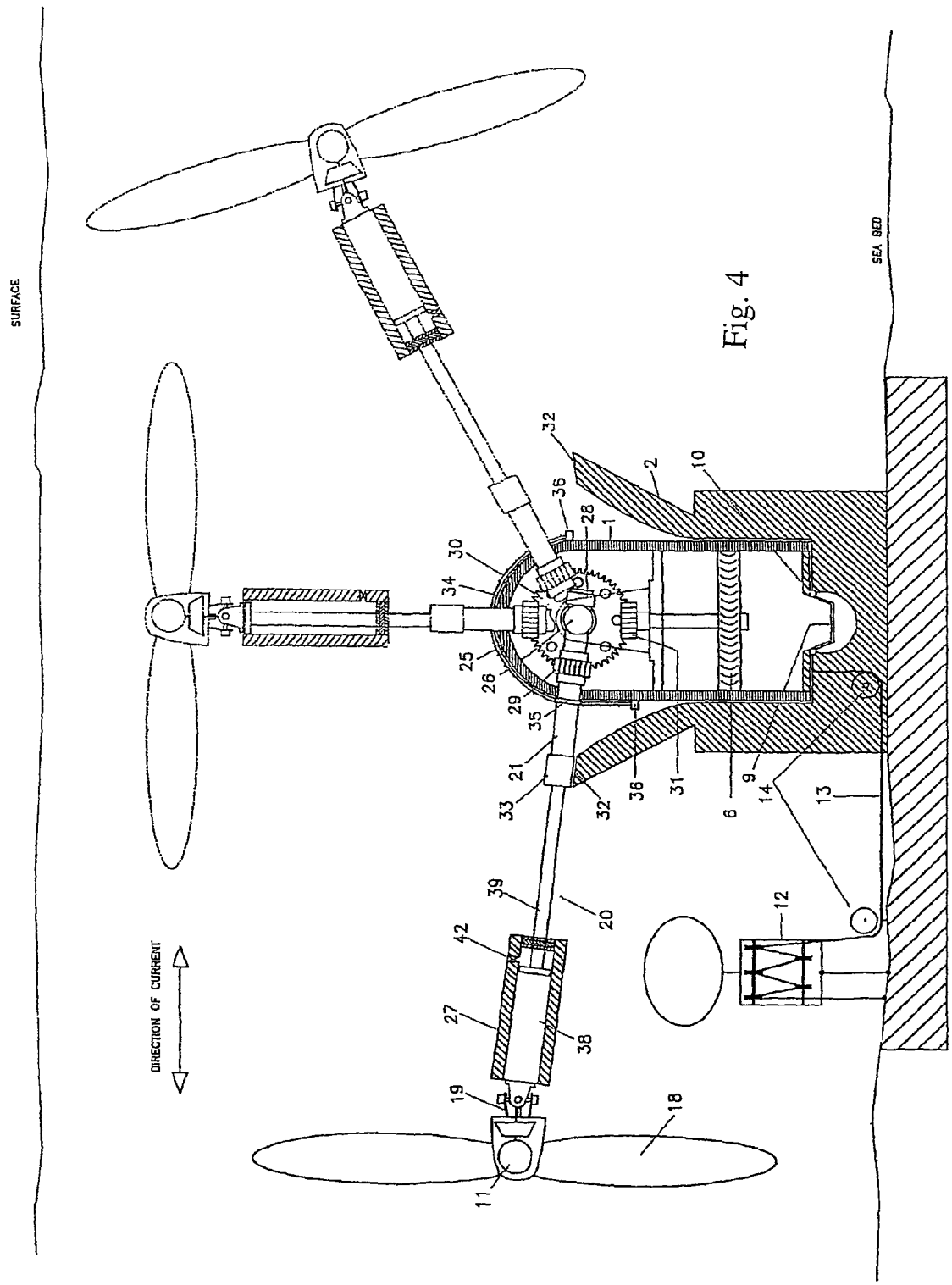
FIG. 4 is a section of a fourth variation of the invention, which shows a third means of preventing the energy-capture means from coming closer to the surface than a prescribed depth, even around and at tidal null points.

In FIG. 4, tubes (20) and (21) are replaced by piston cylinder (38) with buoyancy collar (27) and piston rod (39) which runs in cylinder (39). As can be seen in FIG. 6D, the end of cylinder (38) through which rod (39) passes, contains, as well as the usual gland, an internal slot (40). Pin (41), inserted transversely into rod (39), fits into slot (40) so as to lock both components together for rotary motion. Such motion from the reaction means can then be transmitted by the combination of rod (39) and cylinder (38) in the same way as by tubes (20) and (21) in the earlier-described variant of the invention. Valve (42) in the wall of cylinder (38) allows water access to cylinder (38). In this variant of the invention, water for pumping enters through the downstream side of slot (25) or, if it is necessary to take it in from a higher level because of the amount of abrasive material in the stream, this can be through tubes as illustrated at (7, 7) in FIG. 1.

In operation of this variant of the invention, with valve (42) continuously open, when the tide flows, pressure on reaction means (18) pulls piston rod (39) through cylinder (38) to expel the water in it through valve (42). The same pressure pulls pin (41) into slot (40) and holds it in position, so that power from reaction means (18) is transmitted to the pumping mechanism through the combined rotation of cylinder (38) and piston rod (39). When the tidal flow ceases to exert its pull on piston rod (39), external water pressure acts to fill cylinder (38) through valve (42). This moves the head of piston rod (39) to the other end of cylinder (38) and so correspondingly reduces the distance between the pumping mechanism on the sea bed and reaction means (18). In this way, reaction means (18) is kept from rising above a prescribed depth around and at the tidal null point.

Figure 5:
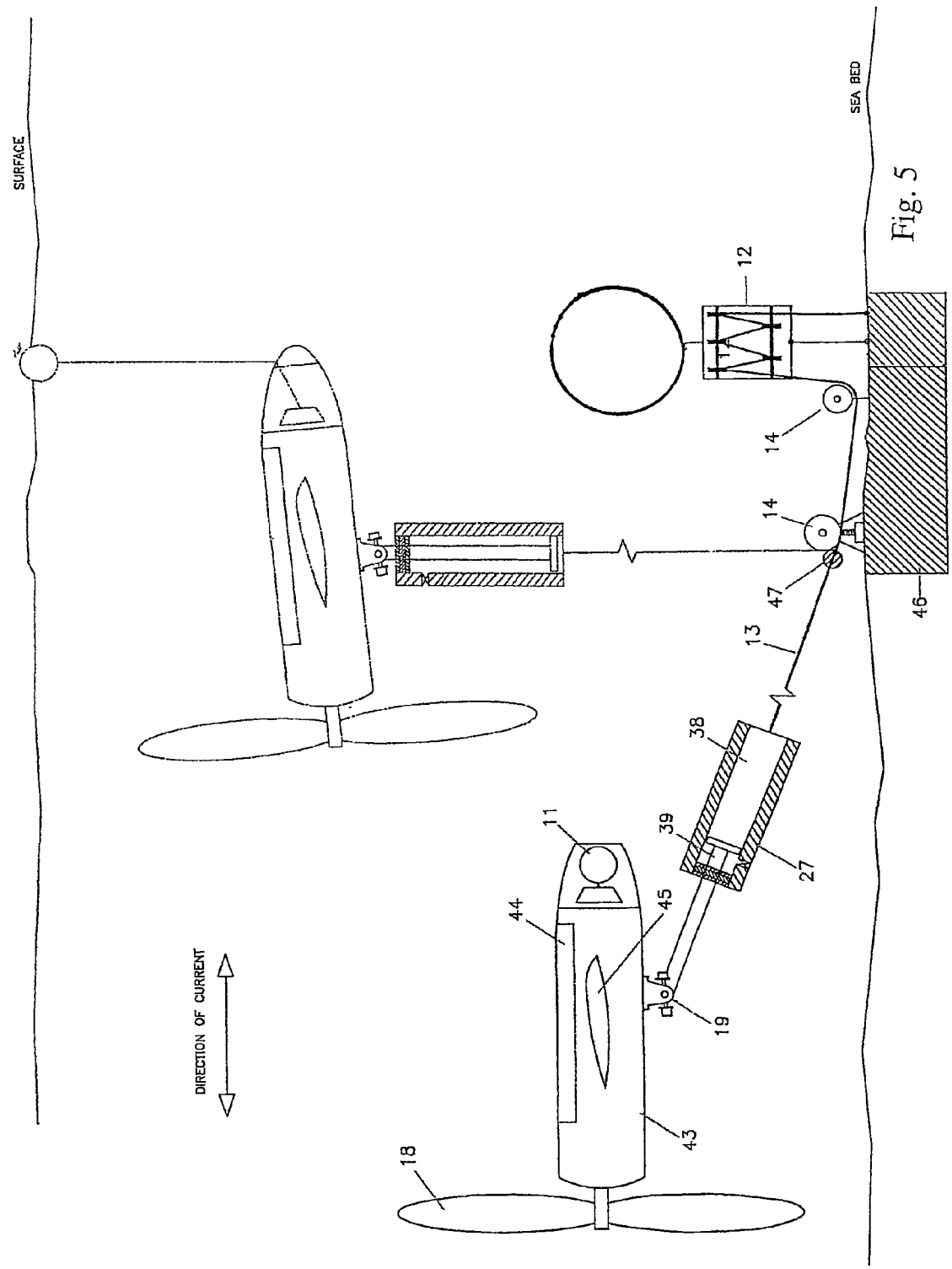
FIG. 5 is a side elevation of a fifth variant of the invention, in which free-stream tidal energy from a tidal current is converted into electrical energy in an underwater generator which is prevented from coming closer to the surface than a prescribed depth, even around and at the tidal null points.

In FIG. 5, an electrical generator housing (43) and reaction means (18) have some built-in positive buoyancy (44). Hydrofoil (45) is attached to housing (43). Anchor (46) is attached to the sea bed, and carries pulleys (14, 14) around which cable (13) passes to float and pulley assembly (12). The float of this assembly has greater buoyancy than buoyancy (44). The other end of cable (13) is attached to one end of piston cylinder (38) within which piston rod (39) operates. Buoyancy collar (27) renders piston cylinder (38) and piston rod (39) of substantially neutral buoyancy. In this variant of the invention valve (42) is normally held open. The other end of piston rod (39) is connected to housing (43) by flexible coupling (19). Stopper (47) on cable (13) cannot pass around pulley (14) and therefore limits the distance between anchor (46) and piston cylinder (38) in normal operation. Remotely actuated marker float and line and reel assembly (11) which has been described earlier, and of which details can be found in FIGS. 6A to 6C, is attached to the top of generator housing (43). The cables which carry the electrical current from the generator to land are not shown. It will be clear that in this variant of the invention, since piston cylinder (38) and piston rod (39) are not required to transmit rotatory power, they do not need to have the slot (40) and pin (41) as in the variant of the invention illustrated in FIG. 4.

In operation of this fifth variant of the invention, when tidal flow is operating, its force on reaction means (18) carries this downstream, and causes piston rod (39) to move so as to expel water from cylinder (38) through valve (42). This increases the distance between housing (43) and anchor (46). As the rate of flow increases, the angle of the combination of cable (42) piston cylinder (38) and piston rod (39) is pressed closer to the horizontal, but the combination of buoyancy (44) and the lift generated by hydrofoil (45) resists this pressure from the tidal stream so as to prevent reaction means (18) from coming into contact with the sea bed. As the null point of tidal flow approaches, the buoyancy of the combination of generator housing (43) and reaction means (18) tends to position them vertically over anchor (46). In the absence of force from the tidal stream, external pressure will force water into cylinder (38) through valve (42). The effect of this on piston rod (39) is to push most of its length into cylinder (38). The result is to shorten the distance between generator housing (43) and anchor (46) so as to keep housing (43) and reaction means (18) from breaking the water surface. As the tidal current starts up again, its force on reaction means (18) rotates generator housing (43) around flexible coupling (19) to bring the combination of cable (14) piston cylinder (38) and piston rod (39) into the new downstream position for the next cycle of electricity generation. It also pulls piston rod (39) through cylinder (38) to expel water from cylinder (38) through valve (42).

When the system requires maintenance, a barge (not shown) is dynamically positioned over anchor (46) and at a tidal null point the float of assembly (11) is released to the surface for retrieval, as in previous variants of the invention. After maintenance work has been completed, housing (43) is returned to the water, and will be pulled downwards by float and pulley array (12) acting through cable (14) around pulley (13) until the movement of cable (14) is limited by stopper (47) from coming into contact with pulley (13).

Figure 7:
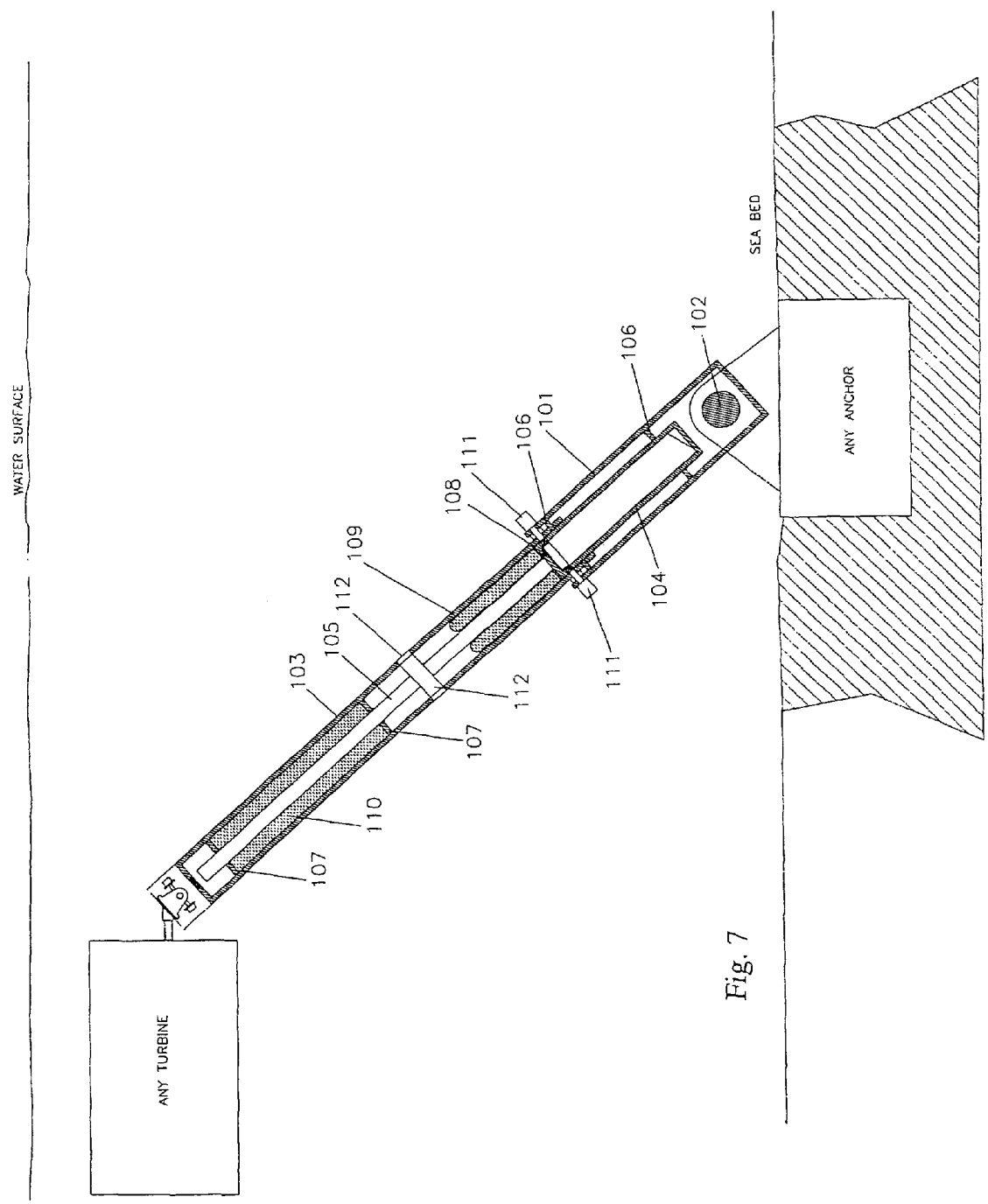
FIGS. 7 to 9 show a version of the invention in which the functions of bearing the force of the tide on the turbine and of controlling the distance between anchor and turbine are separated.
Figure 8:
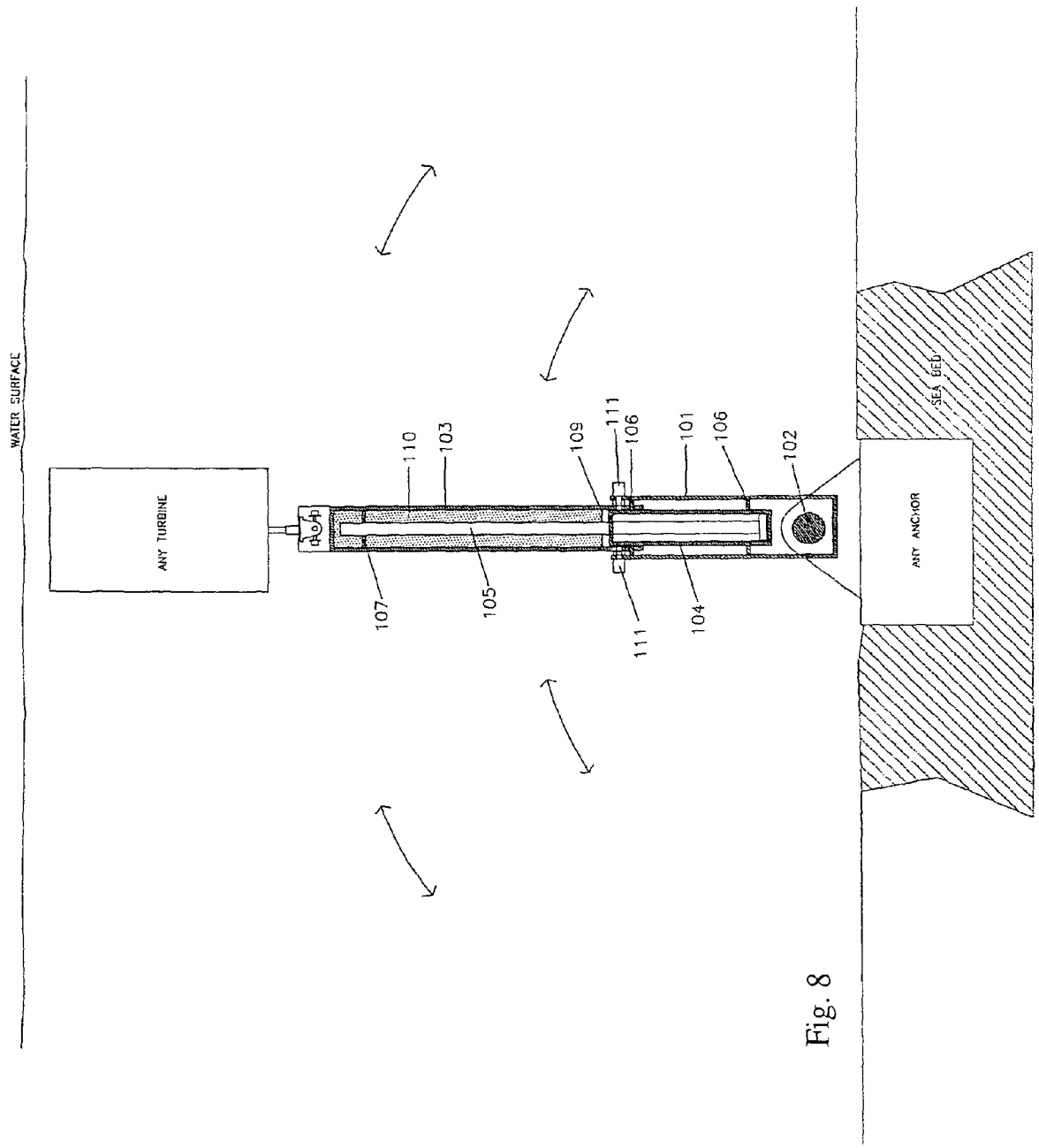
Figure 9:
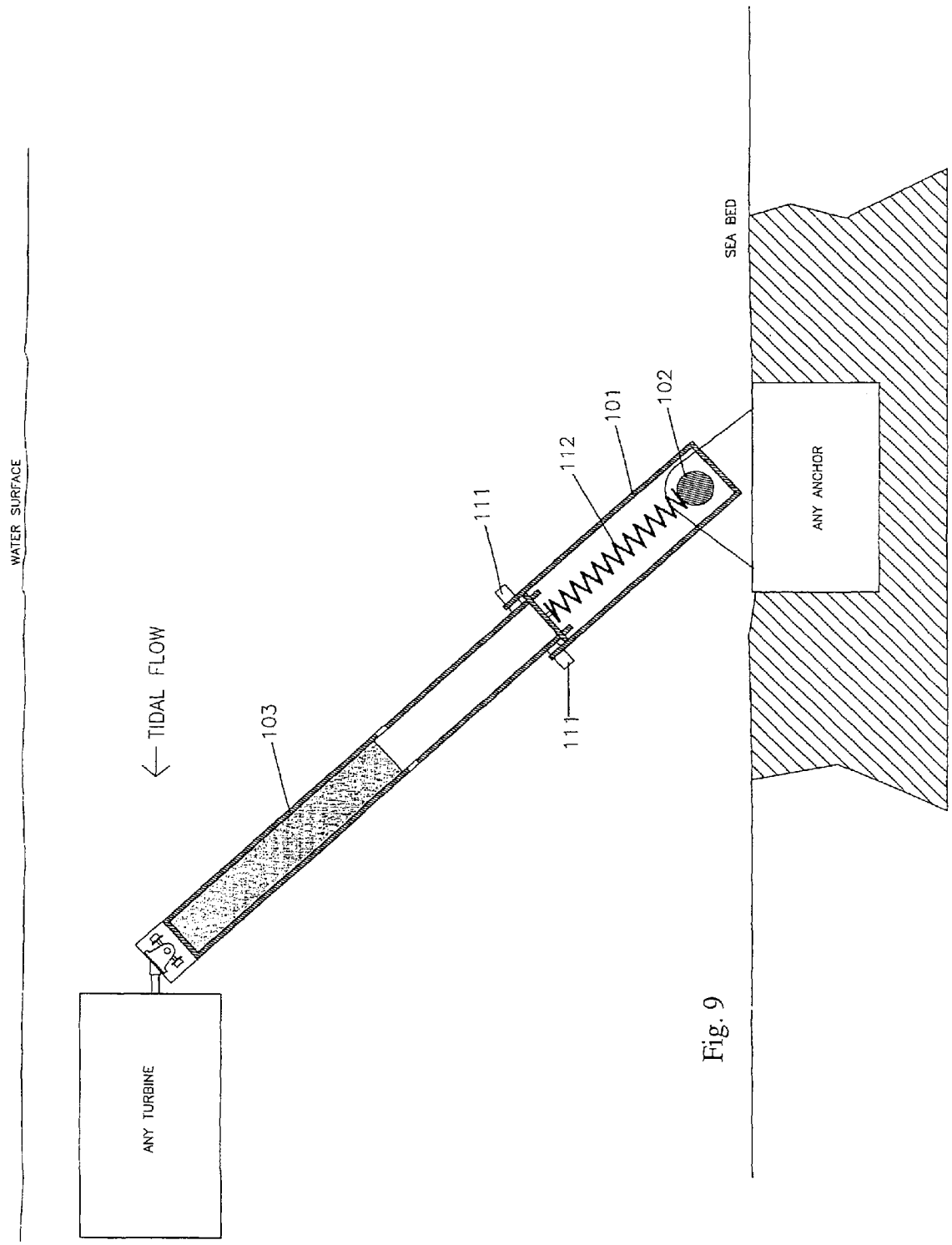

The variant of the invention illustrated in FIGS. 7 to 9 separates the functions of bearing the force of the tide on the turbine from that of controlling the distance between anchor and turbine. It achieves this by means of a two-part telescopic tube, with one part fixed to the anchor and also to the cylinder and the other part fixed to the turbine and also to the piston. Both parts of the tube can be locked together when required by a remote signal. This arrangement enables any required holding power to be obtained by making the telescopic tube as strong as necessary, whilst at the same time the control mechanism can be made of light materials. This control mechanism can either be a piston/cylinder arrangement, as already disclosed, or a spring. Also, by making the piston and cylinder arrangement an oil-filled closed circuit, problems of corrosion and blocking of the valves of the control mechanism by debris can be avoided.

These Figures show that the invention can be used to connect any type of turbine to any type of anchor, although it is assumed that the turbine will have some buoyancy attached to it, to assist in movement of the system to the vertical at the tidal change period. Any such turbine may also have a hydrofoil of the type shown in FIG. 5, to keep it from being pressed too far downwards by the tidal flow.

In FIGS. 7 to 9, 101 is a first tube, which pivots about axle 102 on an anchor. 103 is a second tube, one end of which is attached to the turbine, and the other end slides inside tube 101. 104 is a cylinder and 105 is a piston in it. Lugs 106, 106 connect the cylinder 104 to tube 101 and lugs 107,107 connect piston 105 to tube 103. One of lugs 106 passes through a slot in tube 103 to prevent the tubes from being separated. Valve 108 allows oil to move between cylinder 104 and flexible container 109, according to the movement of piston 105 under the force of the tide. In FIG. 7, container 109 is shown as filled and in FIG. 8 it is collapsed. As disclosed earlier for other variants of the invention, valve 108 can be closed by a remote signal to control movement of piston 105 within cylinder 104. 110 is buoyancy built into the upper part of tube 103. and 111, 111 are remotely actuated locks on tube 101, whose bolts can penetrate holes in reinforced sections of tubes 101 and 103 to lock both tubes together. 112 in FIG. 9 is an extension spring connected at one end to tube 101 and at the other end to tube 103.

In operation, all loads on the turbine are transmitted to the anchor by the combination of tubes 101 and 103. No loads are carried by the control mechanism, whether this is the combination of piston and cylinder or a spring. In either case, this mechanism automatically acts to change the total length of the telescopic tubes which do bear the loads, from a maximum when the tide is flowing to a minimum when it is not. When the piston is moved by tidal force, it moves oil from cylinder 104 through valve 108 to expand flexible container 109. When this force is removed because the tidal flow has dropped, container 109 will collapse as oil flows back into cylinder 104 during the piston's return to its starting point under the force of the vacuum which had been generated in it earlier. If a spring is used, this is extended by the downstream pull of the tide, and its contraction when this pull is released at the tidal null point, telescopes the tubes so that the turbine does not break the surface of the water as it passes through the top of its arcuate movement. Depending upon the water depth and the loading on the system, it may be advantageous to insert a length of cable into the system, between the turbine and the anchor. The total combined length of the connection between turbine and anchor at maximum extension of the system, whether this is done or not, is capable of being more than the water depth at the tidal null point.

When it is desired to retrieve the turbine for maintenance, the locking mechanism is triggered remotely before the tidal flow drops. This prevents any reduction in the combined length of tubes 101 and 103, so that when the tubes return towards the vertical at the tidal change period, the turbine will break the surface and can be detached from the top of tube 103. In the same way, if locking takes place during a tidal null period, by using the second pair of locking holes in tube 103, the combined length of the tubes will be kept at its minimum. When the flow recommences, the arcuate movement of the turbine and tubes will continue as normally, but the level at which the turbine will operate is lower. Consequently, its blades are less subject to damage from storm waves, since these are attenuated with depth.

It will be evident that without going beyond the limits of the invention as disclosed, there are several alternative ways of putting it into practice. As further illustrations, a Darrieus rotor could be one of reaction means (4) or (18). Housing (1) could equally contain an electrical generator instead of a water pump. The telescopic drive shaft could have more components than the two shown as (20, 21) and several combinations of cylinder (38) and piston rod (39) could be linked together. Control of the effective length of cable (42) in FIG. 5 could be by a spring instead of the piston and cylinder arrangement disclosed.

For the second, third and fourth variants of the invention, a hydrofoil as in (40) could be attached to any component of the drive arrangements by a bearing similar to (33) to supplement the effect of buoyancy. A tail fin could be added to such a hydrofoil to adapt it to change in tidal flow direction. Still another possibility would be to install a remotely controlled hydraulic ram in anchor chamber (2) to raise housing (1) with its associated equipment to the surface for maintenance. It will also be clear that other ways of locking and unlocking messenger (50) to receiver (52) could be used. Unlocking, for example, could be by an acoustic signal or timing device. If valve (42) is remotely openable and closeable such as by an acoustic signal, an array of reaction means, each extracting energy from a different level of the tidal stream, could be automatically controlled so as to ensure that no damage to the equipment could result from storms. Wave measurement equipment could be linked to a means of sending signals to close the valves (42) of selected cylinders (38) when these are filled with water and the pin and slot arrangement for making both cylinder (38) and piston rod (39) rotate as one, could be extended along the whole length of cylinder (38). This would prevent force from the reaction means increasing the distance between the reaction means and the anchor when the tide is running, which would mean that the system would operate at a lowered operating depth until the danger of damage to it is past, when signals can be sent to return the valves to normal operation. The same control over the valves could allow them to be closed to access of water, which would mean that the total distance between reaction means and anchor is prevented from being shortened through the force of the tidal flow on the reaction means. This could be arranged to make the upper components of the system break the water surface at a tidal null point, which would obviate the need for marker float (11) and its associated equipment.

In several variants of this invention, the reaction means which extracts energy from the current, could be arranged to pump water higher than the stream level, Either the kinetic energy of this pumped water, or its 'head,' or both, could then be used to drive turbines. If the water is pumped to land, it can be stored, and its potential energy then used also at inter-tidal periods to make energy continuously available. The invention can also be used to improve the output and reliability of windmills. Sandbanks are often used to site offshore wind farms, and the existence of such banks accelerates tidal streams which run past them. When used in conjunction with such windmills, the invention cannot alone reinforce their output when the wind blows, but can also deliver electricity when it does not, because of the regularity of tidal energy.

The invention claimed is:

1. Means of capturing the force of a tidal flow in which a reaction means is connected to an anchor on the sea bed by a pair of connected members, the first of which is fixed at one end to an axis on the anchor so as to be able to move in an arc in the plane of the tidal flow and under the force of that flow, and the other is fixed to the reaction means, and means of using the force of said flow to control the distance between reaction means and anchor according to the tidal cycle, through said members being spring-loaded and slidably related, and adapted to be locked together at prescribed combined lengths.

2. Means as in claim 1, in which said members comprise a rotatable shaft adapted to drive equipment positioned by said anchor.

3. Means of capturing the force of a tidal flow in which a reaction means is connected to an anchor on the sea bed by a pair of connected members, the first of which is fixed at one end to an axis on the anchor so as to be able to move in an arc in the plane of the tidal flow and under the force of that flow, and the other is fixed to the reaction means; means of using the force of the flow to control the distance between reaction means and anchor according to the tidal cycle, and means of locking the members together at prescribed combined lengths; said anchor also being in two parts, one part being fixed in the sea bed and forming a socket for a second part which is a plug adapted to be positioned in the socket by force generated by buoyancy.

4. Means as in claim 3, in which said members form a rotatable shaft adapted to drive equipment positioned in the anchor socket.

* * * * *